Oct. 17, 1967 J. R. YANCEY 3,347,261
METHOD AND MATERIAL FOR SEAL REPAIR
Original Filed Feb. 5, 1962 3 Sheets-Sheet 2
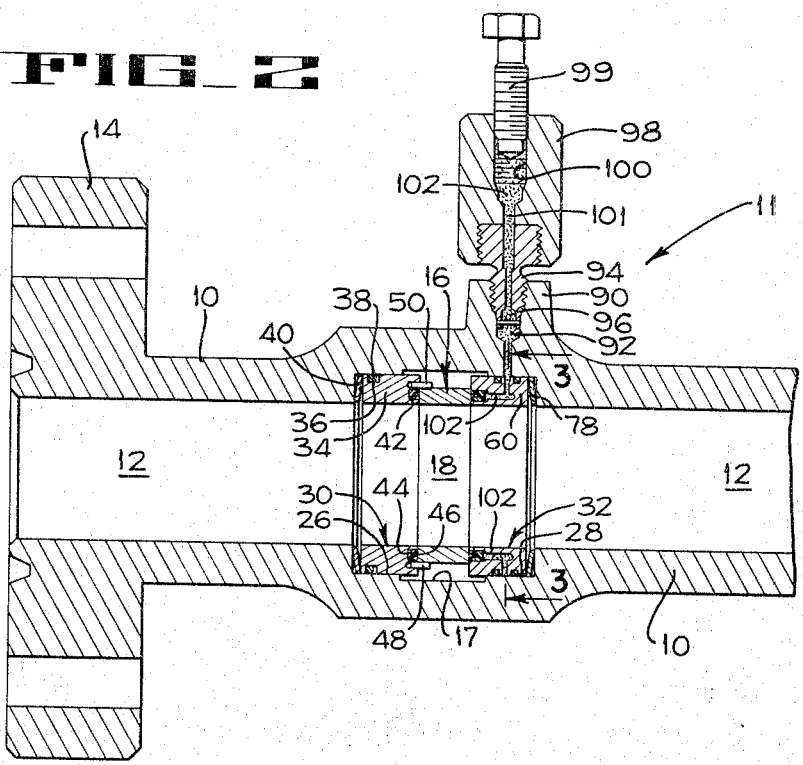
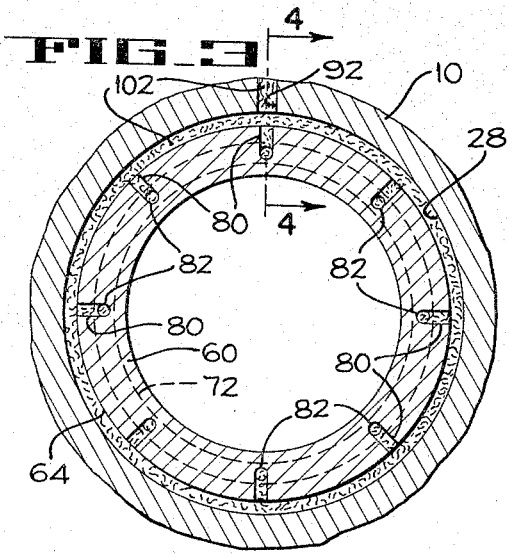
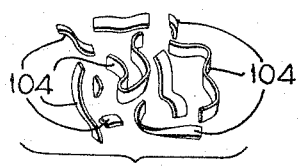
INVENTOR
JOHN R. YANCEY
BY Hans G. Hoffmeister
ATTORNEY

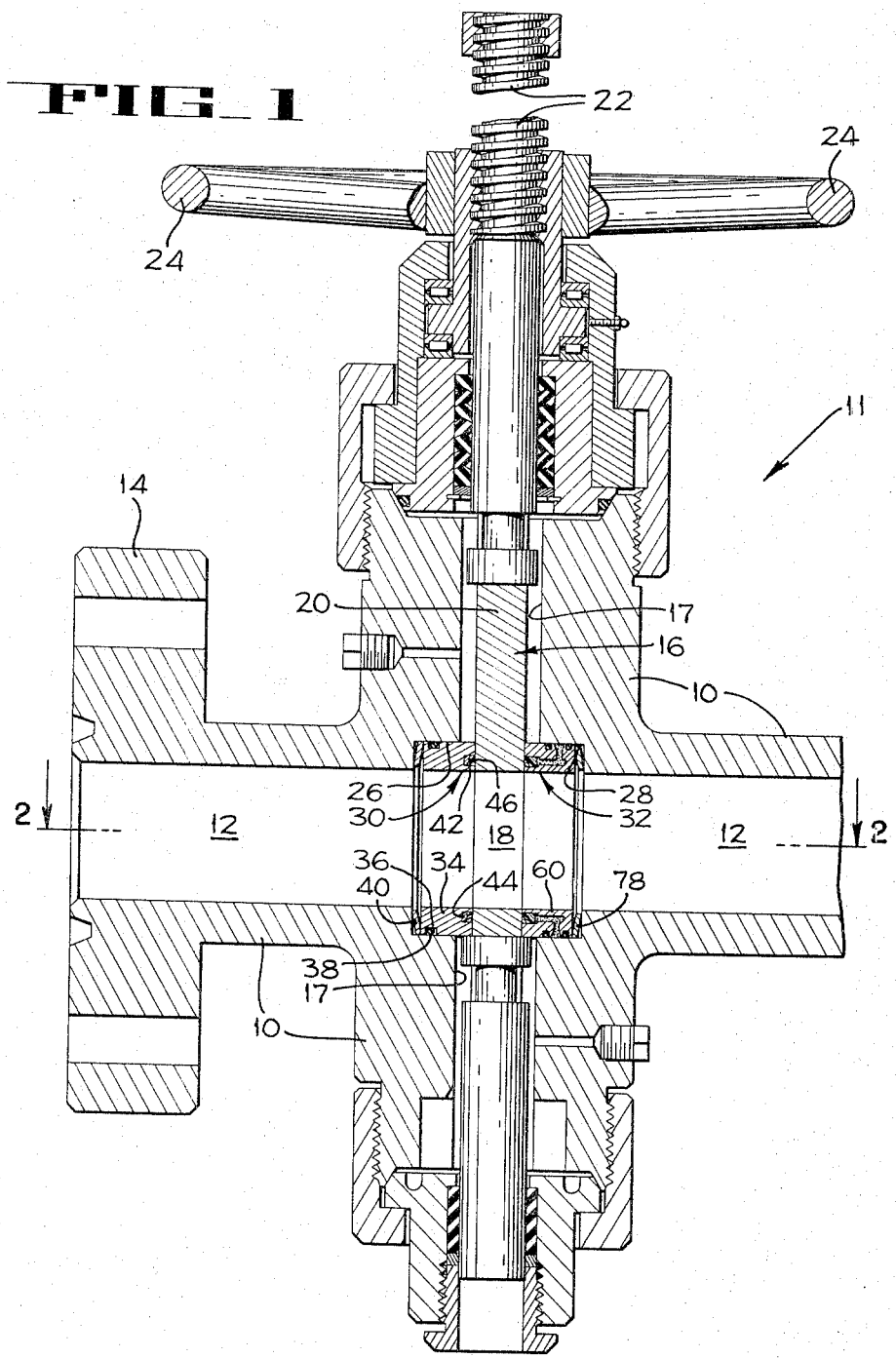

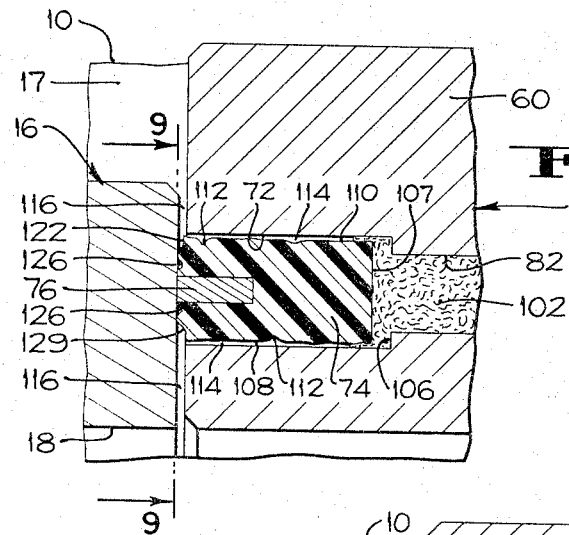
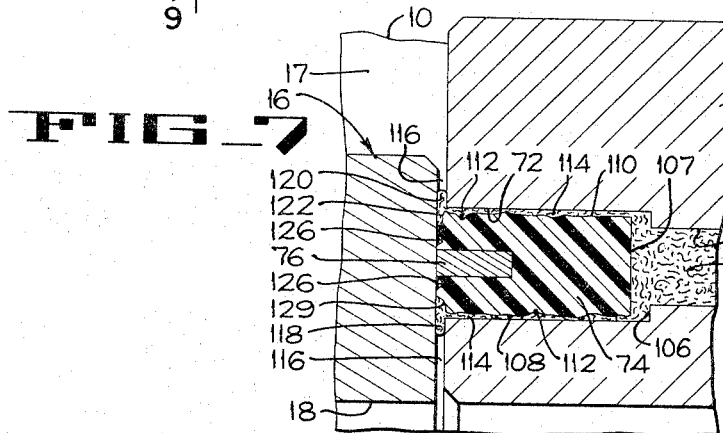
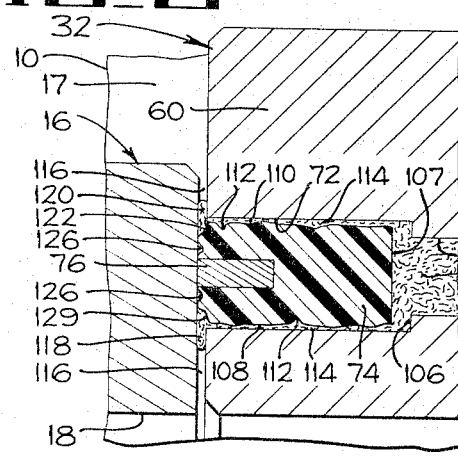
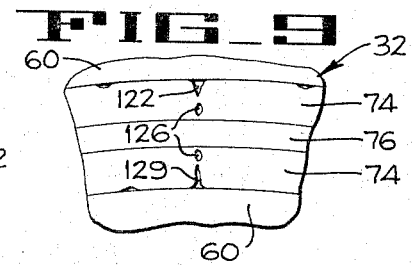

United States Patent Office 3,347,261
Patented Oct. 17, 1967

3,347,261
METHOD AND MATERIAL FOR SEAL REPAIR
John R. Yancey, Houston, Tex., assignor to FMC Corporation, San Jose, Calif., a corporation of Delaware
Continuation of application Ser. No. 171,187, Feb. 5, 1962. This application Oct. 19, 1965, Ser. No. 505,120
4 Claims. (Cl. 137—315)

This application is a continuation of the copending application of John R. Yancey, Ser. No. 171,187, filed Feb. 5, 1962, now abandoned, for Method of and Material for Seal Repair.

The present invention pertains to fluid seals and more particularly relates to seals for controlling leakage between the housing and the movable element of a valve.

Valves handling high pressure fluids within which abrasive materials are entrained often develop leaks because the sealing means of such valves are subject to excessively rapid wear, particularly when solids or abrasives are trapped between a moving gate and the seal during actuation of the valve. In some instances, pieces of the seal are actually torn away, thus causing severe leakage.

Some valves have provision for injecting grease under pressure into the valve so that the grease replaces torn away parts and fills other voids such as pits and crevices in the seals, thus prolonging the seals' useful life. This effects a temporary repair and is sometimes a desirable procedure because otherwise the flow through the valve must be stopped and the valve disassembled in order to replace the seal. However, this has proven to be an unsatisfactory method of repairing a faulty valve seal because the grease is quickly washed away by the fluid flowing through the valve. Furthermore, grease is undesirable in a valve handling gases or liquids with entrained gases because frequently the grease will not stand up in the presence of gas.

An object of the present invention is to provide an improved method of repairing a damaged seal element of a valve, swivel joint, or other mechanism including two elements having a fluid seal therebetween, to restore the seal element to a serviceable, operating condition.

Another object is the provision of a repair method which can be performed upon a sealing element while the same is in place within the recess which it normally occupies while in service.

Another object of the invention is to provide a method of repairing a damaged sealing element which can be performed without interrupting either the flow or the pressure of fluid contained within the sealed structure.

Another object is the provision of an improved composition for use in reconditioning worn, pitted, torn or otherwise cavitied sealing faces of sealing elements composed of tough, oil-impervious, flexible, polymeric material, such as Teflon.

Other objects and advantages of the present invention will become apparent from the following description and from the accompanying drawings, wherein:

FIGURE 1 is a longitudinal section with parts broken away, through a gate valve having seals adapted to be repaired in accordance with the present invention.

FIGURE 2 is a section along line 2—2 of FIG. 1.

FIGURE 3 is an enlarged, partly broken away section along line 3—3 of FIG. 2.

FIGURE 4 is an enlarged section taken generally along line 4—4 of FIG. 3.

FIGURE 5 is an enlarged perspective showing a few representative particles of one of the constituent materials of the seal repairing composition of the invention, in a physical form which has proven to be satisfactory.

FIGURES 6, 7 and 8 are enlarged fragmentary sectional views, partly diagrammatic, illustrating successive steps in the performance of the method of the present invention.

FIGURE 9 is a fragmentary elevation looking in the direction of arrows 9—9 of FIG. 6.

The body 10 of the gate valve 11 shown in FIGS. 1 and 2 is formed with a cylindrical bore 12 extending therethrough and has the usual flanged ends, one of which is shown at 14, for connecting the valve into a flow line. Intermediate the flanges 14, the valve 11 is provided with a gate 16 which is slidably mounted within a transversely extending gate receiving opening 17 in the body 10. The gate 16 is formed with an aperture 18 which is aligned with the bore 12 when the gate 16 is at one extreme of its sliding movement; and a blind end 20 of the gate 16 closes the bore upon movement of the gate to its other extreme position. The gate 16 is moved by a conventional threaded shaft 22 and hand wheel 24. The valve body 10 is counterbored on each side of the gate chamber 17 to provide two annular recesses 26 and 28 concentric with the bore 12. Cylindrical sealing assemblies 30 and 32 are received in the recesses 26 and 28, respectively.

The sealing assembly 30 (FIGS. 1 and 2) comprises a metal ring 34 having an outwardly opening peripheral groove 36 within which an O-ring 38 is mounted to seal between the ring 34 and the wall of the recess 26. A spring washer 40 is under compression between one face of the ring 34 and the bottom of the recess 26 to urge the opposite face of the ring into engagement with the adjacent face of the gate 16. The face of the ring 34 which engages the gate 16 is provided with an annular groove 42 within which a Teflon seal ring 44 is mounted. The Teflon ring 44 may have embedded therein a metal ring 46 which stiffens and reinforces the Teflon ring, although it has been ascertained that for various types of service a Teflon ring without the metal reinforcement is satisfactory. Two pins 48 and 50 are embedded in and project from the face of the ring 34, one adjacent each side of the gate, to guide and center the gate with respect to the sealing assemblies 30 and 32.

As best shown in FIGS. 3 and 4, the sealing assembly 32 within the recess 28 comprises a metal ring 60 similar to the ring 34, but having three annular grooves 62, 64 and 66 formed in its peripheral surface. The two outermost grooves 62 and 66 are provided with O-rings 68 and 70, respectively, to seal against the wall of the recess 28. The face of the ring 60 adjacent the gate 16 is provided with an annular groove 72 within which is mounted a Teflon seal ring 74. A metal ring 76 may be embedded in the Teflon ring 74 to stiffen and reinforce the same although in this instance, also, the metal ring is not always necessary. A spring washer 78 urges the ring 60 toward the gate 16, thus forcing the Teflon ring 74 into sealing engagement with the adjacent face of the gate member 16.

A plurality of radially extending, circumferentially spaced passages 80 join the groove 64 with a corresponding number of axial passages 82 communicating with the groove 72 within which the Teflon ring 74 is mounted.

The housing 10 is provided with a boss 90 (FIG. 2) having a bore 92 therethrough which communicates with the groove 64 in the outer surface of the ring 60. A check valve assembly 94 screwed into the outer threaded end of the bore 92 includes a check valve 96 which permits entry of material into the bore 92 but prevents outflow of material from said bore. An injector assembly 98 is adapted to be screwed onto the outer end of the check valve assembly 94 and is provided with an injection stud 99 screwed into a threaded hole 100 which communicates through a bore 101 with the inlet passage of the check valve assembly. It will be understood, therefore, that the injector assembly 98 constitutes means whereby flowable material may be injected through the check valve assembly 94 and the bore 92 and the passages 80 and 82 into the groove 72 within which the seal ring is mounted.

Normally, the seal ring 74 projects slightly from the groove 72 to make a fluid-tight seal between its end face and the valve gate 16. After a period of use, the seal face of the Teflon ring 74 is apt to become abraded, pitted and torn, thus permitting fluid to leak past the gate 16.

The present invention comprehends an improved method of repairing such a damaged seal ring, and also an improved compound for use in the performance of the method. This method and this compound have been found to be very effective in reconditioning damaged gate valve seals made of Teflon so as to greatly prolong the useful life thereof and thereby postpone indefinitely the inconvenience and expense of shutting down pipe lines in which the gate valves are installed to permit substitution of new seals for those of the gate valves which have become unserviceable.

The seal repairing compound 102 (FIGS. 2-4 and 6-8) of the invention comprises a mixture of Teflon particles 104 (FIG. 5) and lubricating oil. It has been found that the oil ordinarily used for lubricating the movable parts of gate valves is well suited for this purpose; for example, a petroleum mineral oil with the S.A.E. viscosity number 30, although oils of other types (e.g., castor oil) and of other viscosities, can be used if circumstances require or permit.

Teflon particles that have been used and found well suited for the purposes of the invention are in the nature of thin, ribbon-like shreds, or shavings, as shown in FIG. 5. In a typical example, shreds 104 that have been found to fulfill the objects of the invention range in thickness of 0.002″ to 0.006″.

Teflon shreds within this thickness range are readily made by pressing a solid piece of Teflon against a revolving cylindrical or tapered cutter having spiral cutting teeth projecting from its surface. Such being the case, a convenient method of forming the shreds 104 is to feed a rod of Teflon endwise between two such cutters carried by a head that rotates about the axis of the rod and so mounted on the head that each cutter rotates about its own axis. The axes of the two cutters, or at least the surfaces thereof against which the rod is pressed, converge in the direction in which the rod is moved in being fed to the cutters. Produced in this way, most of the shreds are approximately ⅛″ in width, and some are an inch or more in length, although most are less than ½″ long if land out flat. However, instead of lying flat, the shreds are twisted, curled, and crumpled, and mixed with and trapped by the ribbon-like pieces are some particles as small as to be described more accurately as flakes.

According to the invention, Teflon particles of this character are mixed with the lubricating oil in such proportions as to produce a dough-like substance sufficiently stiff for a lump of the compound to hold its shape when laid upon a supporting surface and yet sufficiently soft and plastic, or flowable, to be injectable under hydrostatic pressure through passages of relatively small cross section, such as the bores 101 and 92 and the passages 80 and 82. Three parts by weight of the Teflon particles to one part of lubricating oil have been found to produce a compound having a suitable consistency.

The ingredients are thoroughly mixed, as by a kneading or working process, either mechanically or by hand, during which the Teflon shreds become more crumpled and entangled or interlaced with each other, and to a considerable degree loose their flat, ribbon-like character, assuming a thick threadlike character somewhat resembling that of fibrous asbestos.

The plastic or flowable nature of the compound is an important feature thereof in that it makes it possible to force the compound into the seal ring groove 72 and into the seal cavities which it is desired to fill by means of the injector assembly. The characteristic surface lubricity of Teflon, augmented by the lubricating qualities of the interstitial lubricating oil, are important factors in making the fairly stiff compound 102 sufficiently flowable to be forced under pressure through the bores 101 and 92 and the passages 80 and 82 into the seal ring groove 72.

In practicing the method of the invention, a supply of the compound 102 is placed within the injector mechanism 98, preferably in sufficient quantity to fill the hole 100 and bore 101 thereof almost to capacity. The injection stud 99 is then entered into the outer end of the hole 100, and the injector assembly 98 is screwed onto the check valve assembly, unless, of course, the filling of the check valve assembly was performed with the body member of the assembly already installed. Then, by screwing the injection stud 99 inward, the compound 102 can be forced into and through the check valve assembly 94, the bore 92, the annular groove 64, and the passages 80 and 82 into the seal ring groove 72. It may be necessary to retract the injection stud 99 and refill the hole 100 of the injector assembly with compound 102 and then to operate the injector assembly again in order to force a sufficient quantity of the compound into the seal groove 72 to accomplish the purposes of the invention.

FIGS. 6, 7 and 8 illustrate the final phases of the process of repairing a worn, pitted, torn or otherwise cavitied Teflon seal ring 74 by means of the method and compound of the invention. It is to be understood that in these figures, the clearance spaces between the seal 74 and the bounding walls of the seal ring groove 72, as well as pits and other cavities in the seal 74, are shown in greatly exaggerated size to assist in the following description. As clearly shown in these figures, the passages 82 enter the seal ring groove 72 through the bottom wall 106 thereof, i.e., the wall which is remote from the interface between the seal 74 and the gate 16. Hence, the initial effect of the injection of the compound 102 into the groove 72 is to impose hydrostatic pressure upon back or bottom surface 107 of the seal 74 in the direction which makes the compound 102 push the seal 74 toward the gate 16, as indicated in FIG. 6, thereby increasing the physical pressure of the seal against the gate. This is one of the reasons that the method of the invention restores the sealing efficiency of the seal 74.

Upon continued application of pressure to the compound 102 by further tightening of the stud 99, compound 102 is forced to flow around the seal 74, i.e., across the inner and outer circumferential walls 108 and 110 thereof, as indicated in FIG. 7. In so doing, the compound 102 fills any tears, pits or other cavities 112 in the circumferential walls 108 and 110.

Further application of pressure to the compound 102 forces the compound all the way through the clearance spaces 114 between the circumferential walls 108 and 110 of the seal and the corresponding walls of the groove 72 and into the clearance space 116 between the gate 16 and the seal assembly 32.

Microscopic examination of the working face of a seal assembly 32 after it has been in service in a gate valve and has been treated in accordance with the present invention reveals that as the pressurized compound 102 enters the clearance space 116, it tends to spread in both directions from each of its two lines of entry thereinto, and principally in the direction away from the seal 74. The reason for this is that due to the hydrostatic pressure of the compound 102 exerted against the back or bottom surface 107 of the seal 74, the seal is pressed firmly against the gate, leaving little or no clearance space between the seal 74 and the gate, except in those areas of the seal's working surface which are pitted, torn, or otherwise cavitied. Consequently, as imposition of pressure upon the compound 102 is continued or resumed after the material enters the clearance space 116, the compound is forced to flow therein away from the seal, forming flange-like extrusions 118 and 120 corresponding in thickness to the width of the clearance space 116. The width of these extrusions 118 and 120 is irregular and is dependent upon the width of the clearance space 116, the degree of fluidity possessed by the compound 102, and the pressure imposed upon the compound 102 by the injector assembly 98. In any case, however, the stiffness of the compound 102 is such that the compound extrudes only a short distance away from the seal before such resistance to its movement is encountered that its further penetration into the clearance space in the directions away from the seal 74 is blocked, each of the extrusions 118 and 120 having become a dam preventing further movement of the compound away from the seal 74.

As the resistance to movement of the compound away from the seal 74 thus increases, more and more of the material is forced into the cavities in the working face of the seal which open at the sides, i.e., the circumferential surfaces, of the seal. Two such cavities are indicated at 122 and 129 in FIGS. 6–9. FIGS. 6, 7 and 8 show these cavities in successive stages of entry of the material thereinto, until they are completely filled thereby, as shown in FIG. 8.

Microscopic examination of the working surface of a seal assembly 32 which has been in service and has been treated in accordance with the present invention reveals that even blind pits and other cavities 126 in the working face of the seal, i.e., cavities which do not communicate with the clearance space 116 beyond the confines of the seal, are filled with the compound. How the material penetrates into these "closed" cavities is not fully understood, but it is presumed that the inherent yieldability of the Teflon of which the seal is made permits a small area of the seal 74 to move away from the surface of the gate 16 far enough to permit the pressurized compound to squeeze therepast and into the cavities 126. Another possibility is that small masses of the dough-like substance are "wiped" into the closed cavities as the gate 16 is moved while in sliding engagement with the seal 74.

In any case, any pits, cracks, tears and other cavities in the working surface and in the circumferential surfaces of the seal 74 are filled by the compound which is compacted thereinto under heavy hydrostatic pressure. In this way, the surfaces of the seal are built up and thus made so smooth, or devoid of surface irregularities, that the sealing efficiency of the seal is renewed and the useful life of the seal prolonged. The fact that the method of the invention makes it possible to thus recondition the seal without requiring disassembly of the valve is of great importance because it avoids shutting down, or even reducing flow or pressure within a pipe line in order to re-establish the effectiveness of a seal in a valve installed in the pipe line.

After a valve seal has been renewed with the compound 102 and flow through the valve continued or resumed, most of the oil trapped within the interstices of the matted Teflon strands is washed away, leaving the Teflon particles so tightly interlaced and compacted within the cavities that they remain therein, thus making the repair nearly, if not quite as durable as the body of the seal, an advantage of the shredded nature of the principal constituent of the repair compound which is not possessed of a compound composed of granular or ground material.

While the invention has been described and illustrated as being applied to the sealing assembly 32, it is obvious that the inventive concept could easily be applied to both of the sealing assemblies 30 and 32. Furthermore, whereas the method and compound of the invention have been illustrated and described in connection with the sealing assemblies 30 and 32 of a gate valve, it is to be understood that the invention is equally adapted for use in repairing damaged seals of other types of valves, and, in fact, in repairing the seals of other pneumatic or hydraulic apparatus including two members having a fluid seal therebetween, such as swivel joints. It will likewise be understood that the invention is capable of further modification and variation without departing from the principles of the invention and that the scope of the invention should be limited only by the scope and proper interpretation of the claims appended hereto.

The invention having thus been described what is believed to be new and is desired to be protected by Letters Patent is:

1. The method of renewing a service-cavitied sealing element that forms a fluid seal between closely fitting members while the sealing element is in place in a recess in one of said members, the sealing element being formed of polymeric material; comprising the steps of injecting a flowable mixture of closely packed, interlaced shreds of said sealing element material and an interstitial lubricating oil into the seal containing recess, continuing injection of said mixture under pressure sufficient to cause the mixture to flow peripherally around the sealing element and to form a dam between the valve members adjacent the sealing element, and completing the injection by forcing and compacting said mixture into the cavities of the sealing element to recondition sealing faces on the sealing element.

2. A method for re-establishing fluid-tight integrity in a used seal of a fluid handling apparatus which includes a flow passage surrounded by a ring having an end face and having walls defining an annular groove opening out of said face, a member having a sealing surface extending around said passage and confronting said end face, and an annular seal ring of polymeric material disposed in said groove and having sides confronting said groove walls and a seal face confronting and capable of engaging said sealing surface in fluid-tight relation therewith but being subject to the development of leakage paths between said sealing surface and said seal ring and to the development of voids and cavities as a result of breaking and tearing when exposed to pressure in said flow passage, said method comprising forcing a flowable composition that includes a mass of particles of substantially non-compressible and fluid impervious plastic seal material and a lubricous liquid into said groove and against said seal ring thereby forcing said seal ring into fluid-tight engagement with said sealing furface and closing leakage paths that have developed and thereby forcing said seal material between said groove walls and the seal ring and into cavities or voids which have developed so as to restore the seal ring to substantially its original shape, each of said particles having a thickness in the range of about 0.002 inch to about 0.006 inch, a width of about ⅛ inch, and a length of from about ½ inch to about 1 inch, said particles being entangled in said composition.

3. A method for re-establishing fluid-tight integrity in a used seal of a fluid handling apparatus which includes a flow passage surrounded by a ring having an end face and having walls defining an annular groove opening out of said face, a member having a sealing surface extending around said passage and confronting said end face, and an annular seal ring of polymeric material disposed in said groove and having sides confronting said groove walls and a seal face confronting and capable of engaging said sealing surface in fluid-tight relation therewith but being subject to the development of leakage paths between said sealing surface and said seal ring and to the development of voids and cavities as a result of breaking and tearing when exposed to pressure in said flow passage, said method comprising forcing a flowable composition that includes a mass of particles of substantially non-compressible and fluid impervious plastic seal material and a lubricous liquid into said groove and against said seal ring thereby forcing said seal ring into fluid-tight engagement with said sealing surface and closing leakage paths that have developed and thereby forcing said seal material between said groove walls and the seal ring and into cavities or voids which have developed so as to restore the seal ring to substantially its original shape, each of said particles being made of Teflon and having a thickness in the range of about 0.002 inch to about 0.006 inch, a width of about ⅛ inch, and a length of from about ½ inch to about 1 inch, said particles being entangled in said composition, said liquid being a lubricating oil.

4. A method for re-establishing fluid-tight integrity in a used seal of a fluid handling apparatus which includes a flow passage surrounded by a ring having an end face and having walls defining an annular groove opening out of said face, a member having a sealing surface extending around said passage and confronting said end face, and an annular seal ring of polymeric material disposed in said groove and having sides confronting said groove walls and a seal face confronting and capable of engaging said sealing surface in fluid-tight relation therewith but being subject to the development of leakage paths between said sealing surface and said seal ring and to the development of voids and cavities as a result of breaking and tearing when exposed to pressure in said flow passage, said method comprising forcing a flowable composition that includes a mass of particles of substantially non-compressible and fluid impervious plastic seal material and a lubricous liquid into said groove and against said seal ring thereby forcing said seal ring into fluid-tight engagement with said sealing surface and closing leakage paths that have developed and thereby forcing said seal material between said groove walls and the seal ring and into cavities or voids which have developed so as to restore the seal ring to substantially its original shape, said particles being a mass of tangled flexible shreds of said plastic seal material.

References Cited
UNITED STATES PATENTS

| | | | |
|---|---|---|---|
| 2,731,282 | 1/1956 | McManus et al. | |
| 2,746,470 | 5/1956 | Laird | 137—15 |
| 2,747,600 | 5/1956 | Laurent | 251—172 |
| 2,838,059 | 6/1958 | Biagi et al. | 137—15 |
| 2,992,028 | 7/1961 | Knox | 277—1 |
| 3,043,794 | 7/1962 | Feiler et al. | 260—33.6 |
| 3,045,693 | 7/1962 | Allen | 137—315 |
| 3,051,678 | 8/1962 | Bentov | 260—33.6 |
| 3,144,040 | 8/1964 | White | 137—315 |

WILLIAM F. O'DEA, *Primary Examiner.*

D. MATTHEWS, *Assistant Examiner.*